Patented Dec. 17, 1935

2,024,212

UNITED STATES PATENT OFFICE 2,024,212

PREPARATION OF RESINOUS CONDENSATION PRODUCTS

Ernst Elbel and Fritz Seebach, Erkner, near Berlin, Germany, assignors to Bakelite Corporation, New York, N. Y., a corporation of Delaware No Drawing. Application May 13, 1933, Serial No. 670,996. In Germany May 13, 1932

5 Claims. (Cl. 260—4)

It is known that condensation products capable of being hardened may be prepared from phenols and aldehydes, especially formaldehyde, by heating, suitably in the presence of catalysts. Said condensation products are at first fusible and soluble in alcohol or acetone, and, by further heating they are converted into an infusible but still softenable condition and finally into a hard, infusible and insoluble final state. During condensation of phenol with formaldehyde in the presence of ammonia as a catalyst, a resin is obtained which is at first liquid then becoming a solidifying, alcohol-soluble and fusible resin which on further heating gradually loses its solubility in alcohol and is converted into an infusible, but still softenable resin, and if heated sufficiently, it finally becomes hard, insoluble and infusible. The alcohol-soluble and fusible condition of the resin is called the A—stage, the infusible but still softenable condition is called the B—stage, and the hard, insoluble and infusible final condition the C—stage. Hereinafter A—, B— and C—resins are used in this sense, so that we understand A—resins to be fusible resins which are soluble in alcohol and acetone; B—resins to be insoluble or incompletely insoluble in alcohol and acetone under ordinary pressure and infusible but still softenable; and C—resins the hard, insoluble and infusible condensation products. One can also proceed by preparing first a non-hardenable resin of the novolak type, converting the same into a hardenable resin by the subsequent action of aldehydes. Similar heat-hardenable condensation products, which are known in the A—, B— and C—stages, may be prepared from phenols and aldehydes together with other reaction components, especially fatty oils or by combining the novolaks or the heat-hardenable resins into homogeneous products with other substances, for example fatty oils.

The condensation products prepared from phenols and aldehydes, if necessary with the addition of other materials, are used as binders, painting and coating agents, as for example lacquers or the like, ordinarily in A—stage, i. e. in the form of resoles, or as a substitute therefor, in the form of mixtures of the novolaks with hardening agents. It is advantageous in some respects to use these products in the B—stage rather than the resoles; however, the use of B—resins is greatly handicapped because of their lack of solubility. Although it is known to prepare with the aid of high boiling solvents solutions from phenol-aldehyde-resins which are not soluble in alcohol and/or acetone or only incompletely soluble therein, it is necessary for some purposes to use solutions that are prepared with comparatively low boiling or volatile solvents.

We have found that resinous condensation products containing phenols and aldehydes which have under ordinary pressure more or less completely lost their solubility in alcohol and acetone may be prepared which are readily soluble in volatile solvents, for example acetone, by proceeding in the following manner.

For example, by condensing phenol, cresol or other phenols with formaldehyde in the presence of ammonia as contact agent, a hardenable condensation product is prepared in the usual manner, which is heated until it loses partly or entirely its solubility in alcohol. The resulting resin is dissolved by heating in a suitable solvent, for example cyclo-hexanol, and according to the present invention, the resin is precipitated from this solution by adding a non-solvent liquid, for example ligroine, ethyl alcohol, hexane or cyclo-hexane. All those liquids which do not dissolve the B—resins used as starting material and which mix homogeneously with the solvent used for dissolving the initial material are suitable as precipitants. The same result is obtained by heating in cyclo-hexanol a more or less completely condensed resole, i. e. a liquid or solid resole, or a mixture of a novolak with hardening agents, or the components leading to resin formation, and the solution is heated until the formation of the condensation product, which is insoluble or only incompletely soluble in alcohol, is effected. This may be ascertained by taking samples from time to time during the heating, precipitating therefrom the resin by adding ligroine, and testing the precipitated and washed resin for its solubility in ethyl alcohol under ordinary pressure. To carry out the invention, ordinary resoles or even such resoles, are used from which by the aid of a suitable treatment the free phenols for example are removed, or such condensation products are used in which the hydroxyl groups are partly etherified or esterified. One may also proceed in a manner that from solutions containing condensation products that are not soluble or only incompletely soluble in alcohol or acetone, the largest part of the solvent used is eliminated, for example by heating under ordinary or decreased pressure, and the residue which may consist for example of 90% resin and 10% solvent, is dissolved directly in a volatile solvent, such as acetone, and without using a precipitating agent. With the use of a precipitating agent the condensation products are best precipitated by adding the precipitating agent in proper quantity to the cold solution. The procedure can also be followed of evaporating more or less for example ⅓ to ⅘ of the solvent and, after cooling the solution, causing precipitation by adding precipitating agents. This affords an economy in the amount of precipitating agent required. The precipitated resin is separated mechanically from the liquid in any well-known manner, washed and if necessary dried. The precipitated resins are readily soluble—even when cold—for example in acetone, acetic ether and in mixtures of benzol and methylated spirits. If the precipitated resin is treated with comparatively small quantities of ethyl alcohol, homogeneous products representing concentrated solutions of the precipitated resin can be obtained. However, if an attempt is made to dilute these solutions by further additions of ethyl alcohol, the solution becomes turbid, i. e. the resin separates. The resin may for example be dissolved by heating in an equal part by weight of ethyl alcohol. This results in homogeneous liquid which, however, is most viscous as compared with a 50% alcoholic solution of a normal commercial resole.

*Example.*—100 parts by weight of a condensation product prepared from cresol and formaldehyde with ammonia as contact agent, and obtained by heating until loss of solubility in alcohol determined under ordinary pressure, are dissolved by stirring in 200 parts by weight of cyclo-hexanol at approximately 100° C. and under ordinary pressure and stirring. After cooling, the solution is precipitated with 400 parts by weight of ligroine. The precipitated resin is drawn out and washed with ligroine. The filtrate consists of a mixture of cyclo-hexanol and ligroine and can be separated into its component parts in the usual manner by fractionating distillation for the purpose of using it again for dissolving and/or precipitation. The precipitated resin is an almost white and very light powder. It is odorless and soluble in the above mentioned low-boiling solvents, for example acetone.

In order to dissolve the condensation products, which are not soluble or only incompletely soluble in alcohol, other suitable organic liquids than cyclo-hexanol, may be used, for example cyclic ketones, such as cyclo-hexanon, furthermore furfural, esters of the cyclo-hexanols, as for example cyclo-hexanol-acetate; phenol ester, benzyl alcohol, benzyl acetate, glycol acetate, acetin, terpineol, or mixtures of these liquids. Also, a number of liquids mixed together may be used as precipitating agents. To carry out the invention, one may furthermore use the condensation products from phenols, fatty oils and aldehydes, as in accordance with the American patent specification 1,590,079. Or homogeneous composition products of hardenable phenol-aldehyde condensation products with fatty oils as described for example in the French Patent No. 690,335 can be used; such a condensation product may be obtained for example by heating a resole with wood oil in the presence of cyclo-hexanol. Further in practicing the invention, mixtures or fusions of phenol-synthetic resins with natural resins, as for example colophony can be used.

The preparation of readily soluble, highly polymerized, hardenable condensation products is interesting not only from the viewpoint of science, but from the fact that it possesses very practical significance, since on the one hand the use of these highly polymerized products reduces considerably the necessary hardening time, and on the other hand, when using equal quantities of binders due to the easier conversion into the C—stage, the resulting articles have greater strength or, if a similar strength is obtained, smaller quantities of binders need be used than if one starts with resoles. A remarkable feature is the extraordinary ease with which the products made according to the invention, being light colored powders, are absorbed by the low boiling or volatile solvent. It dissolves with great ease even when cold. When pouring a solution of the precipitated resin in acetone on a metal plate and letting it flow off, a film is obtained in the short space of 20-30 seconds which dries to a dust-free condition. The solutions made from the precipitated resins may be diluted with methylated spirits.

The thus easily soluble though highly polymerized, heat-hardenable condensation products obtained through precipitation can be used to advantage in the place of resoles for the most varied applications. Molded articles can be made from them with or without addition of fillers, dyes, plasticizing agents, or the like, or other suitable additions. They can be used as binders, in preparing laminated products, for example from continuous paper sheets, continuous fabric sheets, or other fibrous materials. Dissolving them in the volatile solvents named, they yield rapidly drying and rapidly hardening lacquers. They are useful as adhesives, cements, and binders in the manufacture of molded pieces of any kind and also for the preparation of abrasive articles. The resins prepared according to the invention may further be used in mixture with resoles or other natural or artificial, hardenable or non-hardenable resins, and also in mixture with other plastic masses, as for example viscose, acetyl-cellulose, etc.

We claim:

1. Process of preparing a heat-hardenable resinous phenol-formaldehyde condensation product in a state of advancement characterized by solubility in acetone and infusibility but softening upon heating which comprises forming a solution of a phenol-formaldehyde condensation product which is insoluble in acetone and infusible but softening upon heating, and precipitating the condensation product from the solution by adding thereto a diluent in amount sufficient to cause separation of the condensation product.

2. Process according to claim 1 in which the precipitation is caused by the addition of other liquids.

3. Process according to claim 1 in which the precipitation is caused by the addition of a non-solvent liquid.

4. A heat-hardenable resinous phenol-formaldehyde condensation product characterized by solubility in acetone and infusibility but softening upon heating.

5. A heat-hardening resinous phenol-formaldehyde condensation product comprising the precipitant from a solution of an acetone insoluble condensation product, said precipitant being characterized by solubility in acetone and infusibility but softening upon heating.

ERNST ELBEL.
FRITZ SEEBACH.